US005611547A

United States Patent [19]

Baugh et al.

[11] Patent Number: 5,611,547

[45] Date of Patent: Mar. 18, 1997

[54] ELONGATED SEAL ASSEMBLY FOR SEALING WELL TUBING-TO LINER ANNULUS

[75] Inventors: John L. Baugh, Houston; Anthony C. Machala, Willis, both of Tex.

[73] Assignee: Baker Hughes Incorporated, Houston, Tex.

[21] Appl. No.: 585,545

[22] Filed: Jan. 11, 1996

Related U.S. Application Data

[63] Continuation of Ser. No. 147,992, Nov. 4, 1993, abandoned.

[51] Int. Cl.[6] .......... F16J 15/28

[52] U.S. Cl. .......... 277/121; 277/123; 277/205; 166/179; 166/118

[58] Field of Search .......... 277/121, 123, 277/124, 125, 188 A, 205; 166/118, 135, 179, 192

[56] References Cited

U.S. PATENT DOCUMENTS

| | | | |
|---|---|---|---|
| 2,702,220 | 2/1955 | Jonson | 277/205 X |
| 2,704,580 | 3/1955 | Brown | 166/179 X |
| 2,704,581 | 3/1955 | Potts | 277/116.2 |
| 2,841,007 | 7/1958 | Loomis | 277/125 X |
| 3,020,958 | 2/1962 | Kenneday | 166/178 X |
| 3,071,960 | 1/1963 | Knapp et al. | 166/118 X |
| 4,588,030 | 5/1986 | Blizzard . | |
| 5,426,236 | 9/1993 | Szarka et al. . | |

FOREIGN PATENT DOCUMENTS

| | | | |
|---|---|---|---|
| 946439 | 1/1951 | France | 277/205 |
| 70748 | 12/1930 | Sweden | 277/205 |
| 969155 | 9/1964 | United Kingdom | 277/188 A |
| 1183664 | 11/1964 | United Kingdom . | |

*Primary Examiner*—Scott Cummings
*Attorney, Agent, or Firm*—Rosenblatt & Redano, P.C.

[57] ABSTRACT

A seal useful for high temperature and high-differential pressures, particularly in sour gas wells, is disclosed. The preferred embodiment of the seal is an elongated member having features akin to a chevron-type seal at at least one end, coupled with at least one interference seal. A pocket is created in between these two elements which can trap atmospheric pressure, thereby enhancing the ability of downhole well fluids to compress the seal against a mandrel for facilitating its installation in a liner bore. The additional structural rigidity provided by the variety of alternative designs presented overcomes the tendency of the chevron portion of the seal to fail to seat due to downhole fluid pressures, displacing the chevron portion out of shape prior to its insertion into a liner bore.

19 Claims, 1 Drawing Sheet

ELONGATED SEAL ASSEMBLY FOR SEALING WELL TUBING-TO LINER ANNULUS

This is a continuation of application Ser. No. 08/147,992 filed on Nov. 4, 1993, now abandoned.

FIELD OF THE INVENTION

The invention relates to seals, particularly those useful downhole in high-temperature and differential pressure environments, to seal between production tubing and a liner.

BACKGROUND OF THE INVENTION

Exploration for gas frequently involves significant well depths, coupled with hostile conditions such as high pressures and temperatures. Additionally, the gas may be "sour," further contributing to a hostile environment for seals. In order to produce from zones which may be as deep as 20,000 ft below the surface or more, where downhole temperatures can reach 500° F. or more and differential pressures can be as high as 20,000 psi, designs employing chevron-type seals have been used to seal between a liner and the production tubing. Such assembly of chevron seals is illustrated in FIG. 1. The production tubing (not shown) is connected to a mandrel 10. A lower travel stop comprises rings 12 and 14 which are threaded together at thread 16 over key 18, which extends into a keyway 20 in mandrel 10. Above the assembly of rings 12 and 14 is an extrusion ring 22. Extrusion ring 22 can be made from 25% glass-filled teflon, used with or without a metal back-up ring, or alternatively, a material known as PEEK (polyether-ether-ketone). Its purpose is to prevent extrusion of rings 24. In the past, the service temperature and differential pressure determined some of the materials used for the seal illustrated in FIG. 1. For example, for services of about 450° F. with differential pressures of about 15,000 psi, extrusion ring 22 was made from PEEK. Above extrusion ring 22, a stack of upwardly oriented chevron packing rings 24, made preferably from a composite material known as molyglass, which is a composite of teflon, fiberglass and molybdenum disulfate, was used. This material provided excellent chemical resistance to sour gas formation fluids, acids as well as other treating fluids, in combination with the necessary thermal and mechanical properties for a sealing system for the parameters stated. Above the stack of upwardly oriented chevron seal rings 24 was an O-ring 26, separating all the upwardly oriented chevron rings 24 from the downwardly oriented chevron rings 28. Above the downwardly oriented chevron rings 28 was an upper extrusion ring 30, followed by ring 32 engaged to ring 34 at thread 36 over key 38, which extended into a keyway 40 in mandrel 10. Extrusion rings 22 and 30 were interference-fit onto mandrel 10 and capable of some movement during the installation of the mandrel 10 into a liner bore (not shown).

In the past, in an effort to ensure that a sealing assembly, such as that shown in FIG. 1, would effectively seal between the mandrel 10 and the liner, multiple stacks of such seals 24 or 28 as shown in FIG. 1 were used. Sometimes as many as 20 different stacks would be attached to a mandrel 10 for interaction with the liner bore with the hope that adequate sealing bidirectionally would be obtained from at least one of the assemblies. With such adverse conditions, reliability of the seal assembly shown in FIG. 1 was of great concern, necessitating numerous back-up assemblies mounted to the same mandrel 10. The opposite orientations of chevron seals

24 and 28 were required for the purpose of sealing against differential pressures in either direction. The chevron seal stack 24 was useful in sealing against differentials involving higher uphole pressures, while the stack 28 was useful in sealing against differential pressures with higher downhole pressures.

Typically, the production tubing would be assembled at the wellbore and gradually lowered into position in the liner to seal off the production tubing against the liner at the desired depth. This initial assembly could result in the upper end of the production tubing being in the wrong position with respect to the rig floor. If this situation occurred, the assembly of seals as shown in FIG. 1 would have to be disengaged from the liner bore so that the proper end joint at the surface could be installed to get the appropriate terminal height for the production tubing with respect to the rig floor. The placement or "stabbing in" of the stacks of seals as shown in FIG. 1 in high-temperature environments proved to be detrimental to the reliability of such seal assemblies to seal effectively between the production tubing and the liner bore.

Several problems were encountered due primarily to the high-temperature environment, as well as various hydraulic phenomena which acted to defeat the proper placement of the downwardly oriented chevron rings 28 with respect to the liner bore.

When using repetitive stacks of seal assemblies such as that shown in FIG. 1, the lower-most seal assembly would obviously be the first to engage the liner bore, where its diameter is reduced for seal contact. The upwardly oriented chevron seals 24 would have to fit into a liner bore which, for the purposes of minimizing extrusion, was only slightly larger than the retaining ring 22. Each of the upwardly oriented chevron rings would flex as the mandrel 10 was advanced into the seal bore in the liner. Since each of the chevron rings 24 had a cutout 42 separating an internal wing 44 from an external wing 46, the external wings 46 would readily flex inwardly toward mandrel 10 as mandrel 10 was advanced into the sealing bore of the liner. The chevron stack 24 could also shift upwardly in response to downward movements of mandrel 10. The extrusion ring 22 could also move slightly upwardly in response to the same downward movement of mandrel 10, trying to seat off the upwardly oriented chevron rings 24. Upon further advancement of mandrel 10, the lower-most downwardly oriented chevron ring 28 would have to have its outer wing 48 compressed so that it could fit into the liner seal bore. However, at that point in time, the liner bore would be filled with well fluids located adjacent O-ring 26. Experience has shown that in certain applications, further advancement of the mandrel 10 resulted in a build-up of hydraulic pressure adjacent O-ring 26, which had the disadvantageous effect of forcing outer wing 48 on not only the first but the entire stack of downwardly oriented chevron rings 28 in a counter-clockwise direction. Accordingly, rather than being installed in the liner bore in the position illustrated in FIG. 1, all of the outer wings of the chevron rings 28 would instead be deflected so that they would contact the liner bore in an upwardly oriented position, in essence bent back counter-clockwise to fit into the liner bore. Once inserted into the liner in this rotated position, the ability of rings 28 to seal against differential pressure coming from downhole was essentially defeated. The reason that this occurred was that each individual chevron ring 28 could not overcome the hydraulic pressures generated in trying to displace the liquid volume below the chevron rings 28, which occurred while trying to advance those very same chevron rings 28 into the liner bore for sealing. The component nature of the stack of chevron rings did not provide sufficient individual rigidity in each ring 28 to allow the outer wings 48 to overcome hydraulic forces present in the liner bore to prevent the adverse counter-clockwise deflection. This situation was further aggravated with similar stacks of seals such as those illustrated in FIG. 1 but located further up on mandrel 10. Clearly, once the first seal assembly as shown in FIG. 1 would seat against a liner bore, further advancement of mandrel 10 would clearly not allow any well fluid to be displaced downwardly beyond the first seal assembly which had already seated against the liner bore. What was needed and found lacking in the prior design was sufficient structural rigidity for the downwardly oriented chevron seal members 28 so that they could withstand the hydraulic forces placed on them as the mandrel 10 was being advanced into the liner bore for sealing therewith.

The seal element of the present invention addresses the issue of the required rigidity so that the sealing element properly goes in its desired location between the mandrel 10 and the liner bore and effectively enters the liner bore, retaining its initial shape so that effective sealing against differential pressures in either direction can be accomplished. By increasing the reliability of the seal between the liner and the mandrel, significant expense reductions can be recognized by reducing or perhaps eliminating back-up sealing assemblies on the mandrel 10. In another feature of the invention, low-pressure pockets are created between the seal member and the mandrel, thus inducing built-in pressure differentials which tend to use the energy of the surrounding well fluid to act against the seal member to reduce its profile. This facilitates insertion of the seal into a liner bore, which frequently involves very close clearances in order to effectively address the concern of potential extrusion. Various embodiments of the invention are disclosed, some of which are unidirectional and are used in opposed stacks, while others are bidirectional and comprise of a single sealing element. An additional interference back-up sealing feature is provided with each seal member to further assist in sealing against the liner bore.

SUMMARY OF THE INVENTION

A seal useful for high temperature and high-differential pressures, particularly in sour gas wells, is disclosed. The preferred embodiment of the seal is an elongated member having features akin to a chevron-type seal at at least one end, coupled with at least one interference seal. A pocket is created in between these two elements which can trap atmospheric pressure, thereby enhancing the ability of downhole well fluids to compress the seal against a mandrel for facilitating its installation in a liner bore. The additional structural rigidity provided by the variety of alternative designs presented overcomes the tendency of the chevron portion of the seal to fail to seat due to downhole fluid pressures, displacing the chevron portion out of shape prior to its insertion into a liner bore.

DETAILED DESCRIPTION OF THE PREFERRED EMBODIMENT

Figure 2:
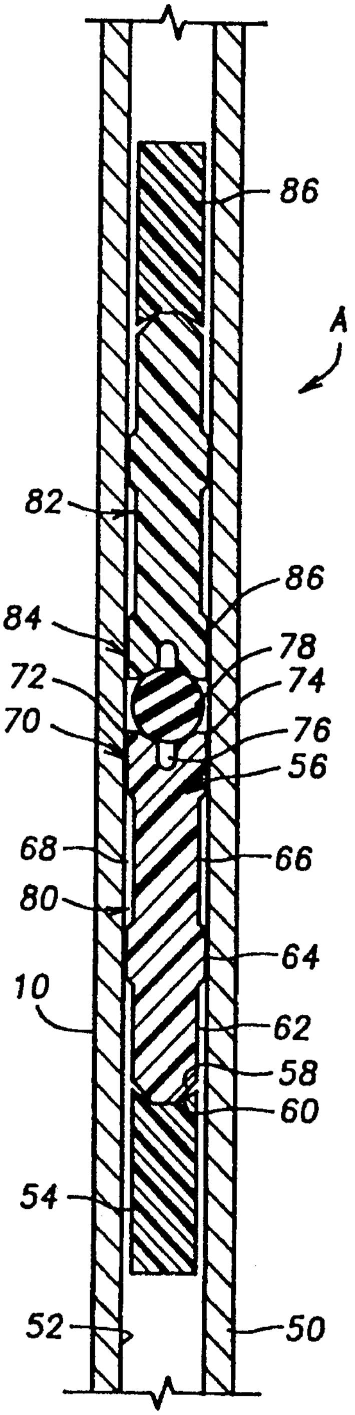
FIG. 2 is a sectional elevational assembly of one of the embodiments of the seal of the present invention.

The apparatus A of the present invention, in one embodiment, is illustrated in FIG. 2. A liner 50 is placed in a wellbore. The mandrel 10 has a mounting surface 52 which accommodates the apparatus A of the present invention. Extrusion ring 54 is in the lower-most position on mounting surface 52. On top of that is a seal 56 of the present invention. The lower end of seal 56 has a taper 58 (preferably 45°) to conform with the recess 60 of extrusion ring 54. Above taper 58 is a cylindrical section 62 which is of a thinner section than seal section 64. Seal section 64 has a sufficient thickness so that it is an interference-fit between mounting surface 52 and liner 50, while cylindrical section 62 is not in contact with liner 50 or at least is not in an interference-fit with liner 50. Above seal section 64 is another cylindrical section 66 which has similar dimensions to cylindrical section 62 insofar as it is preferably not in contact with liner 50 but at least does not form an interference-fit if it does contact liner 50. By virtue of the reduced thickness of cylindrical section 66, a pocket 68 is created between mandrel 10 and cylindrical section 66. This pocket traps air at atmospheric pressure when the apparatus A is assembled onto the mandrel 10. Located above cylindrical section 66 is chevron section 70. Chevron section 70 has an inner wing 72 and an outer wing 74 separated by a groove 76. The radial thickness of chevron section 70 is such that it forms an interference-fit between mounting surface 52 and liner 50 as mandrel 10 is advanced with respect to liner 50. While chevron sections 70 and 84 are shown at an end of seals 56 and 64, structures that incorporate placement of the chevron sections at other points of the body of seals 56 and 64, as well as other points of seal 92, may be used without departing from the spirit of the invention.

Mounted above the chevron section 72 is an O-ring 78. O-ring 78 separates the lower seal just described from its identical twin oriented above O-ring 78 in an opposite direction, as shown in FIG. 2. As can be seen from FIG. 2, the lower seal element 80 has an upwardly oriented chevron section 70, while the upper sealing element 82 has a downwardly oriented chevron sealing section 84.

It should be noted that the seal section 64 can be placed closer or further from taper 58. In fact, cylindrical section 62 can be completely eliminated by placing the seal section 64 immediately adjacent taper 58 without departing from the spirit of the invention. Alternatively, the seal section 64 can be completely eliminated, with the lower sealing element 80 providing a seal solely from its chevron section 70 without any back-up of an interference seal as provided by seal section 64. By making the chevron section 70 integral to an elongated body for the lower seal 80, additional mechanical rigidity is provided to the wings 72 and 74. As previously stated, few problems are encountered in advancing the mandrel 10 to get wings 72 and 74 to go into bore 50. Where the problem in the past has occurred is to try to advance the chevron section 84 which is downwardly oriented on upper element 82 into that same bore 50. While past designs employing stacks of thin, chevron elements have resulted in counter-clockwise deflection of outer wings in downwardly oriented chevron sections of the prior designs, the present design incorporates a unitary structure having significant, overall longitudinal length connected to a chevron section 84, as compared to its thickness (preferably a ratio of about 10:1). As a result, outer wing 86 has sufficient structural strength to displace fluid present around O-ring 78 and to get into bore 50 without adverse counter-clockwise displacement which would, in effect, bend back outer wing 86 and diminish the ability of upper seal 82 to seal against differential pressures where the downhole pressure exceeded the uphole pressure on the seal.

Furthermore, as an aid to inserting the seal assembly shown in FIG. 2, the trapping of air at atmospheric pressure in cavity 68 provides a net unbalanced radial force acting toward mandrel 10 and created by the pressures in the wellbore. This unbalanced force tends to compress the upper and lower sealing elements 82 and 80, respectively, toward the mandrel 10 which facilitates their insertion into bore 50 of the liner so that the assembly can be installed without damage to any portion of the upper and lower seals 82 and 80.

It should be noted that as the upper seal 82 is advanced into the bore of liner 50, there must be some fluid displacement of the fluid trapped adjacent the area of O-ring 78. As shown in FIG. 2, there can be some displacement downwardly of lower seal 80 as well as extrusion ring 54 to accommodate the displacement of fluid away from the area of O-ring 78 as the chevron section 84 of the upper seal 82 is advanced into the bore of liner 50. It should be noted that the lower seal 80, along with extrusion ring 54, would have been upwardly displaced in reaction to downward movement of mandrel 10 as the lower seal 80 advances initially into the bore of liner 50. Thereafter, further advancement of the mandrel 10, coupled with the rigidity of the chevron section 84 of upper element 82, allows for fluid displacement from the area around O-ring 78 by downward displacement of lower seal 80. While specific features have been described with respect to lower seal 80, those same features are found in upper seal 82 when, in the preferred embodiment, identical seals of opposite orientation are used for a single-seal assembly. However, seals of differing dimensions can be used in pairs without departing from the spirit of the invention. Alternatively, an upper seal 82 can be used in combination with upwardly oriented chevron seals of the prior art disposed below O-ring 78 and still be within the purview of the invention. Alternatively, either of the upper or lower seals 82 or 80 can be provided with a back-up seal section such as 64 or neither one of them can include this feature, all without departing from the spirit of the invention.

In the preferred embodiment, the extrusion rings 54 and 86 can be made from PEEK, while the preferred material for the upper and lower sealing elements 82 and 80 is a composite including 15% glass fibers with 5% molybdenum disulfide PTFE (known as moly-glass). This formulation is commercially available from Tetralene, Inc., and sold under the product name COMP. 115M. The material for the extrusion rings 54 and 86 is commercially available from Greene-Tweed, Inc., under the product name PEEK.

While O-ring 78 is illustrated to separate upper sealing element 82 from lower sealing element 80, the two sealing elements can be placed adjacent to each other without a spacer or with spacers of different sizes or shapes without departing from the spirit of the invention. As illustrated in FIG. 2, the chevron sections 70 and 84 in contact with O-ring 78 have tapers 88 and 90 (preferably about 60°) to accommodate the shape of O-ring 78. This exhibits a centering effect on upper and lower sealing elements 80 and 82 and also helps to contain O-ring 78 therebetween. Not shown in FIG. 2 is the standard assembly mounted to mandrel 10 to secure extrusion rings 54 and 86 against movement longitudinally with respect to mandrel 10. This is accomplished in the same manner illustrated in FIG. 1 through the use of the rings such as 12 and 14 threaded together at thread 16 and keyed through key 18 to the mandrel 10 at keyway 20.

Figure 3:
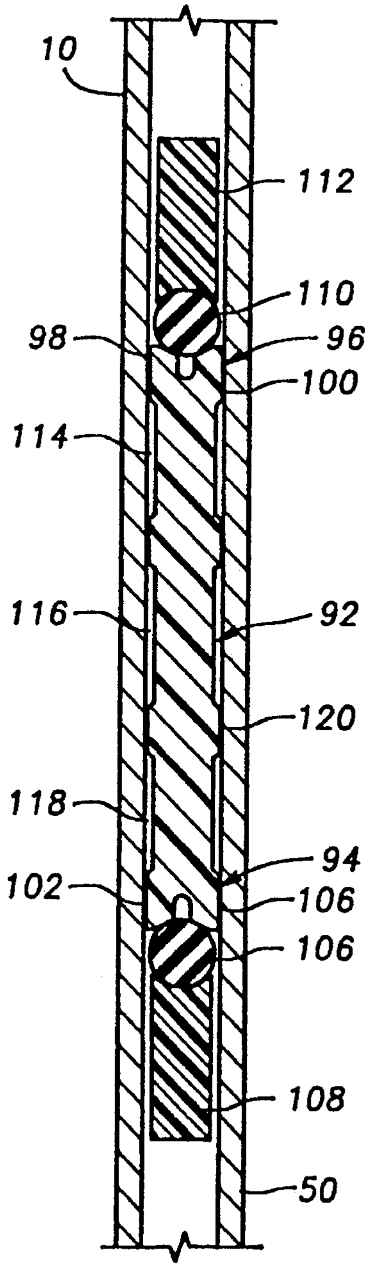
FIG. 3 is a sectional elevational view of the seal assembly of the present invention in an alternative embodiment to that of FIG. 2.

An alternative embodiment to that shown in FIG. 2 is illustrated in FIG. 3. There, rather than using two separate sealing elements 82 and 84 that have opposite orientations, the significant features of each of the sealing members 82 and 84 are combined into a unitary member 92. Seal 92 has a lower chevron section 94 and an upper chevron section 96 oppositely oriented to it. Chevron section 96 has an inner wing 98 and an outer wing 100, while lower chevron section 94 has an inner wing 102 and an outer wing 104. O-ring 106 separates inner and outer wings 102 and 104 from extrusion ring 108. Similarly, O-ring 110 separates inner and outer wings 98 and 100 from extrusion ring 112. The entire assembly is secured to the mandrel 10 in the manner shown in the prior art of FIG. 1.

The seal 92 shown in FIG. 3 has several recessed areas 114, 116, and 118, all of which trap air at atmospheric pressure when the seal 92 is assembled to the mandrel 10. Thereafter, when the mandrel is lowered into the liner bore 50, a differential radially inward force is created on seal 92 due to the fluids at the bottom of the well being at significantly higher pressures than the atmospheric air trapped in cavities 114, 116, and 118. This helps to reduce the profile of the seal 92 as attempts are made to insert it into the bore of liner 50. This helps to reduce the possibility of malfunction of seal 92 due to tearing and abrading as it is stabbed into the bore of liner 50. As seen in FIG. 3, the orientation of chevron section 94 is opposite that of chevron section 96, thus allowing chevron section 94 to seal against differential pressures with a higher downhole pressure, while chevron section 96 seals against differential pressures with a higher uphole pressure. The chevron section 94 is installable in the bore of liner 50 in the orientation shown in FIG. 3 without the adverse effects of the prior art chevron packing sections because of the unitary construction of chevron section 94 to the remainder of the body of seal 92. As a result, even though close clearances are used, sufficient rigidity of outer wing 104 exists to prevent its counter-clockwise deflection as it is inserted into liner bore 50. As previously stated with the embodiment of FIG. 2, sealing sections such as 120 can be provided in varying quantities or left out completely without departing from the spirit of the invention. The use or shape of rings 106 and 110 as spacers between the seal 92 and the extrusion rings 112 and 108 is also optional. Referring to both FIGS. 2 and 3, a single assembly can be used as the entire seal or, alternatively, the mandrel 10 can include any number of stacks of seals of the type shown in FIG. 2 or described as alternatives to it, as well as any type of seals shown in FIG. 3, deployed as a plurality of stacks longitudinally separated on mandrel 10.

Figure 1:
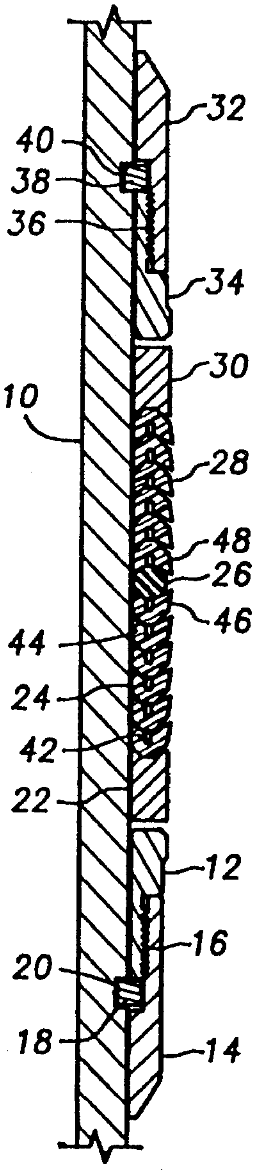
PRIOR ART FIG. 1
FIG. 1 represents the prior art seal assembly.

Another advantage that the designs of the present invention offer over the prior art stacks of chevron rings shown in FIG. 1 is that for each seal assembly, only one downwardly oriented outer wing, such as 104, needs to be inserted into the bore of liner 50. On the other hand, in the prior designs employing a stack of 6 or more chevron seals, each having downwardly oriented outer wings, each outer wing was required to displace fluid in order to be able to be squeezed into the bore of liner 50. This enhanced the probability of the outer wings on the downwardly oriented chevron rings flexing undesirably in a clockwise direction prior to insertion into the bore of the liner. Since each chevron ring operated independently, even though they were stacked, the adjacent rings did not lend sufficient strength to each other to prevent the outer wings of the downwardly oriented chevron rings from pivoting undesirably in a clockwise direction as they were inserted against fluid pressure in the liner bore. This tendency to undesirably flex in a counterclockwise direction upon insertion into the liner bore was further aggravated in the past by flow in the well. However, the designs of the present invention, with the enhanced structural rigidity of the unitary design, allow sufficient strength in the outer wings, such as 86 in FIG. 2 and 104 in FIG. 3, to overcome the forces present in the wellbore, thus preventing the undesirable characteristic of counterclockwise flexing which could defeat the operation of the seal in a differential pressure situation involving larger downhole pressures than uphole pressures.

The foregoing disclosure and description of the invention are illustrative and explanatory thereof, and various changes in the size, shape and materials, as well as in the details of the illustrated construction, may be made without departing from the spirit of the invention.

We claim:

1. A high-pressure, tubing-to-liner annulus seal system for fluids in a well, comprising:

a mandrel forming a part of the tubing;

a seal on said mandrel comprising an elongated annular unitary nonmetallic body, said body formed having at least one set of opposed nonmetallic wings defining an opening therebetween, said wings selectively movable toward each other making said opening smaller in order to facilitate initial insertion of said body into the annulus, said wings in conjunction with said body having sufficient rigidity during insertion into fluids in the well with said opening oriented in the direction of said insertion to resist a fluid force which would otherwise create movement of said wings away from each other which would increase the size of said opening, said resistance facilitating proper orientation of said wings in the annulus; and said wings, upon run-in and before application of a differential fluid pressure, form an interference fit in said annulus, said wings mounted on at least one end of said body.

2. The seal of claim 1, wherein:

said wings have a tapered end surface to facilitate sealing against pressure differentials in the annulus where a greater pressure is applied to said end surface than to said annular body.

3. The seal of claim 2, further comprising:

a groove in said body extending longitudinally into said body from said tapered end surface, said groove effectively separating said wings from each other.

4. The seal of claim 1, wherein:

said body further comprises a plurality of sets of wings on said body,one set of said wings having a first tapered end surface and another set of said wings having a second tapered end surface, said first and second tapered surfaces having opposed taper orientations to each other to facilitate sealing by said body of differential pressure in the annulus in an uphole or downhole direction.

5. A seal assembly for an annular gap between a mandrel and a liner in a well, comprising:

a first elongated annular unitary nonmetallic body formed having a second chevron segment;

a second elongated annular unitary nonmetallic body formed having a second chevron segment;

at least one of said first and second chevron segments comprising at least one first wing oriented for an interference contact with a liner when installed in an annular gap and at least one second wing adjacent said first wing and extending in a different plane than said first wing thus forming an opening therebetween, said wings having sufficient structural rigidity to resist flexing, which would tend to enlarge said opening, from a pressure induced fluid force during insertion into a predetermined depth in the annular gap with said opening oriented in the direction of said insertion, said first and second chevron segments further oriented in opposed directions and spanning the annular gap to resist differential pressures in a well, oriented from above or below said assembly; and said first and second unitary bodies having sufficient longitudinal rigidity under a differential pressure to support a sealing contact with said liner without material lateral flexing.

6. The seal assembly of claim 5, wherein:

said first chevron segment is located adjacent one end of said first body;

said second chevron segment is located adjacent one end of said second body;

said first and second chevron segments mounted adjacent each other in the annular gap.

7. The seal assembly of claim 6, further comprising:

at least one back-up seal on said first body;

at least one back-up seal on said second body.

8. The seal assembly of claim 6, wherein:

each said at least one wing is separated from said body on at least one side thereof, each said wing having a tapered end face, said separation facilitating flexing of said wing so as to reduce said separation to facilitate insertion of said bodies, said bodies sufficiently unitarily formed with said wing to resist enlargement of said separation upon insertion of said bodies.

9. The seal assembly of claim 8, further comprising:

a spacer disposed between said opposed chevron segments, said chevron segments each further comprising a tapered end surface such that opposed tapers of said chevron segments act to at least in part retain said spacer therebetween.

10. The seal of claim 9, further comprising:

a groove in said body extending longitudinally into said body from each said tapered end surface, said groove effectively separating said wings from each other.

11. The seal assembly of claim 10, wherein:

each said chevron segment comprises a pair of opposed wings separated by a groove extending into each said body, said opposed wings forming an end surface generally V-shaped;

said spacer further comprises an O-ring held between said V-shaped surfaces of opposed pairs of wings.

12. A high-pressure, tubing-to-liner annulus seal for a well, comprising:

an elongated annular unitary body, said body formed having at least one set of opposed wings, said wings selectively movable toward each other to facilitate insertion of said body into an annulus, said wings in conjunction with said body having sufficient rigidity to resist movement away from each other upon advancement of said body into the annulus in order to facilitate proper orientation of said wings in the annulus; and at least one backup seal segment on said body having a sufficient cross-section so that it forms an interference fit in the annulus;

said seal segment separated from said wings by at least one portion of said body having a smaller cross-section than said seal segment, defining at least one cavity adjacent said portion, said cavity oriented toward a mandrel, said cavity trapping air at atmospheric pressure when said body is assembled to the mandrel to allow creation of an unbalanced compacting radial force against said body from well fluids in the annulus.

13. The seal of claim 2 wherein:

said body further comprises a plurality of sets of wings on said body, one set of said wings having a first tapered end surface and another set of said wings having a second tapered end surface, said first and second tapered surfaces having opposed taper orientations to each other to facilitate sealing by said body of differential pressure in the annulus in an uphole or downhole direction;

said plurality of said sets of wings mounted on said body, one set to each end thereof.

14. A high-pressure, tubing-to-liner annulus seal for a well, comprising:

an elongated annular unitary body, said body formed having at least one set of opposed wings, said wings selectively movable toward each other to facilitate insertion of said body into an annulus, said wings in conjunction with said body having sufficient rigidity to resist movement away from each other upon advancement of said body into the annulus in order to facilitate proper orientation of said wings in the annulus, said body having a length-to-thickness ratio of about 10:1 or greater.

15. The seal of claim 14 wherein:

said body further comprises a plurality of sets of wings on said body, one set of said wings having a first tapered end surface and another set of said wings having a second tapered end surface, said first and second tapered surfaces having opposed taper orientations to each other to facilitate sealing by said body of differential pressure in the annulus in an uphole or downhole direction.

16. A seal assembly for an annular gap between a mandrel and a liner in a well, comprising:

a first elongated annular unitary body formed having a first chevron segment;

a second elongated annular body formed having a second chevron segment;

at least one back-up seal on said first body; and at least one back-up seal on said second body;

said first and second chevron segments oriented in opposed directions and spanning an annular gap to resist differential pressures in a well, oriented from above or below said assembly, said first chevron segment located adjacent one end of said first body, said second chevron segment located adjacent one end of said second body, said first and second chevron segments mounted adjacent each other in the annular gap;

each said back-up seal having a greater cross-sectional area than adjacent portions of said first or second bodies to define at least one cavity on each of said bodies oriented toward a mandrel, each said cavity entrapping air at atmospheric pressure when assembled to the mandrel, whereupon insertion into a pressurized wellbore an unbalanced radial force acts on said bodies to facilitate their insertion into the annular gap.

17. The seal assembly of claim 16, wherein:

said chevron segments and said back-up seals on said bodies forming an interference fit in the annular gap.

18. A seal assembly for an annular gap between a tubing string and a liner in a well, comprising:

a first elongated annular unitary body formed having a first chevron segment; and a second elongated annular body formed having a second chevron segment;

said first and second chevron segments oriented in opposed directions and spanning an annular gap to resist differential pressures in a well, oriented from above or below said assembly;

the ratio of the longitudinal length of each said body to its radial thickness at said chevron section is about 10:1 or greater.

19. The seal assembly of claim 18 wherein:

said first chevron segment is located adjacent one end of said first body;

said second chevron segment is located adjacent one end of said second body;

said first and second chevron segments are mounted adjacent each other in the annular gap;

each said chevron section further comprising at least one wing oriented for contact with a liner when installed in the annular gap and separated from said body on at least one side thereof, each said wing having a tapered end face, said separation facilitating flexing of said wing so as to reduce said separation to facilitate insertion of said bodies, said bodies sufficiently unitarily formed with said wing to resist enlargement of said separation upon insertion of said bodies;

said seal assembly further comprising a spacer disposed between said opposed chevron segments, said chevron segments each further comprising a tapered end surface such that opposed tapers of said chevron segments act to at least in part retain said spacer therebetween;

each said chevron segment comprising a pair of opposed wings separated by a groove extending into each said body, said opposed wings forming an end surface generally V-shaped;

said spacer further comprising an O-ring held between said V-shaped surfaces of opposed pairs of wings.

* * * * *